United States Patent [19]
Takasan et al.

[11] Patent Number: 6,073,739
[45] Date of Patent: Jun. 13, 2000

[54] RAIL SEGMENTS

[75] Inventors: Masaki Takasan; Yasuharu Odachi, both of Kariya, Japan

[73] Assignee: Kabushiki Kaisha Toyoda Jidoshokki Seisakusho, Aichi-ken, Japan

[21] Appl. No.: 08/891,220

[22] Filed: Jul. 10, 1997

[30] Foreign Application Priority Data

Jul. 11, 1996 [JP] Japan ................................. 8-182024

[51] Int. Cl.[7] ....................................................... B60L 9/00
[52] U.S. Cl. ........................ 191/10; 191/44.1; 191/45 A; 104/106
[58] Field of Search ............................. 191/10, 14, 22 R, 191/44.1, 45 A; 104/89, 93, 106, 107, 109, 110; 439/115

[56] References Cited

U.S. PATENT DOCUMENTS

| 2,428,957 | 10/1947 | Benbow | 191/22 R |
| 3,189,679 | 6/1965 | Scofield | 191/44.1 |
| 5,617,796 | 4/1997 | Trenner et al. | 104/106 |

FOREIGN PATENT DOCUMENTS

| 5336607 | 12/1993 | Japan . | |
| 5344602 | 12/1993 | Japan | 191/10 |
| 8340602 | 12/1996 | Japan . | |

*Primary Examiner*—S. Joseph Morano
*Attorney, Agent, or Firm*—Morgan & Finnegan, L.L.P.

[57] ABSTRACT

A rail is arranged along a predetermined route of a movable body. The movable body is moved by electric power fed through an electric cable wired along the rail. The rail is constituted by a plurality of rail segments. Each segment includes a body having a predetermined length and a channel-like cross section and an electric cable segment supported by the body extending in the axial direction of the body. The electric cable segment is one of a plurality of segments obtained by dividing the electric cable.

8 Claims, 10 Drawing Sheets

RAIL SEGMENTS

BACKGROUND OF THE INVENTION

1. Field of the Invention

The present invention relates to rail segments and a method for wiring feeder cables onto elevated rails such as monorails, which transfer conveyor carriages.

2. Description of the Related Art

There are monorail type carriages, which move along elevated rails suspended from the ceiling of a factory or a warehouse to transport articles between stations. There is a system for feeding electric power to such carriages, which has a feeder cable extending along a rail and a secondary coil opposed to the feeder cable in a non-contacting manner. Alternating current flowing through the feeder cable generates electromagnetic induction in the secondary coil, which is used to drive the carriages (Japanese Unexamined Patent Publication No. 6-153305).

Figure 13:
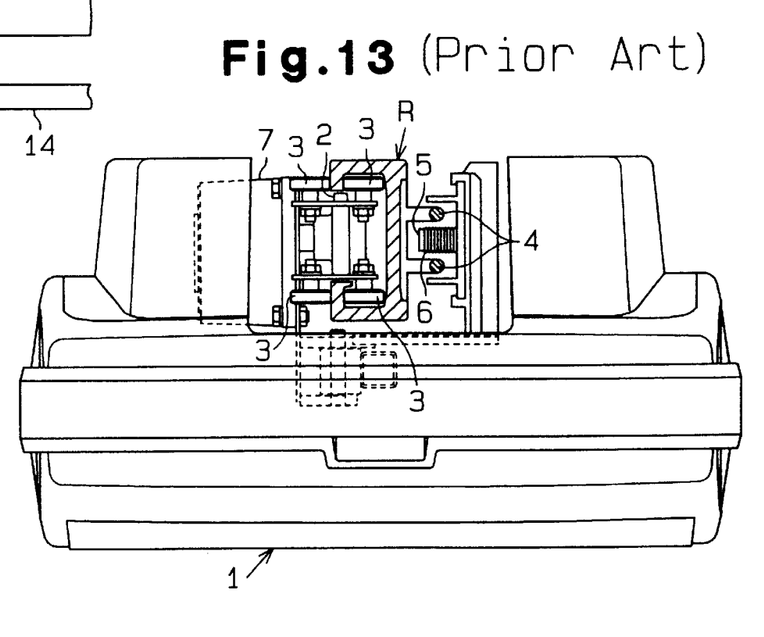
FIG. 13 is a front view showing a carriage suspended from the rail.

FIG. 13 shows a carriage 1 that employs the above power feeding system. The carriage 1 is suspended from a rail R by a plurality of rollers 2, 3. A feeder cable 4 looped into two portions extends beside the rail R. The carriage device 1 moves with its receiving core 5 opposed to the feeder cable 4. The high frequency current flowing through the feeder cable 4 induces electromotive force in a secondary coil 6, which is wound around the receiving core 5. The electromotive force applies drive force to a motor 7, which drives the carriage 1.

Figure 14:
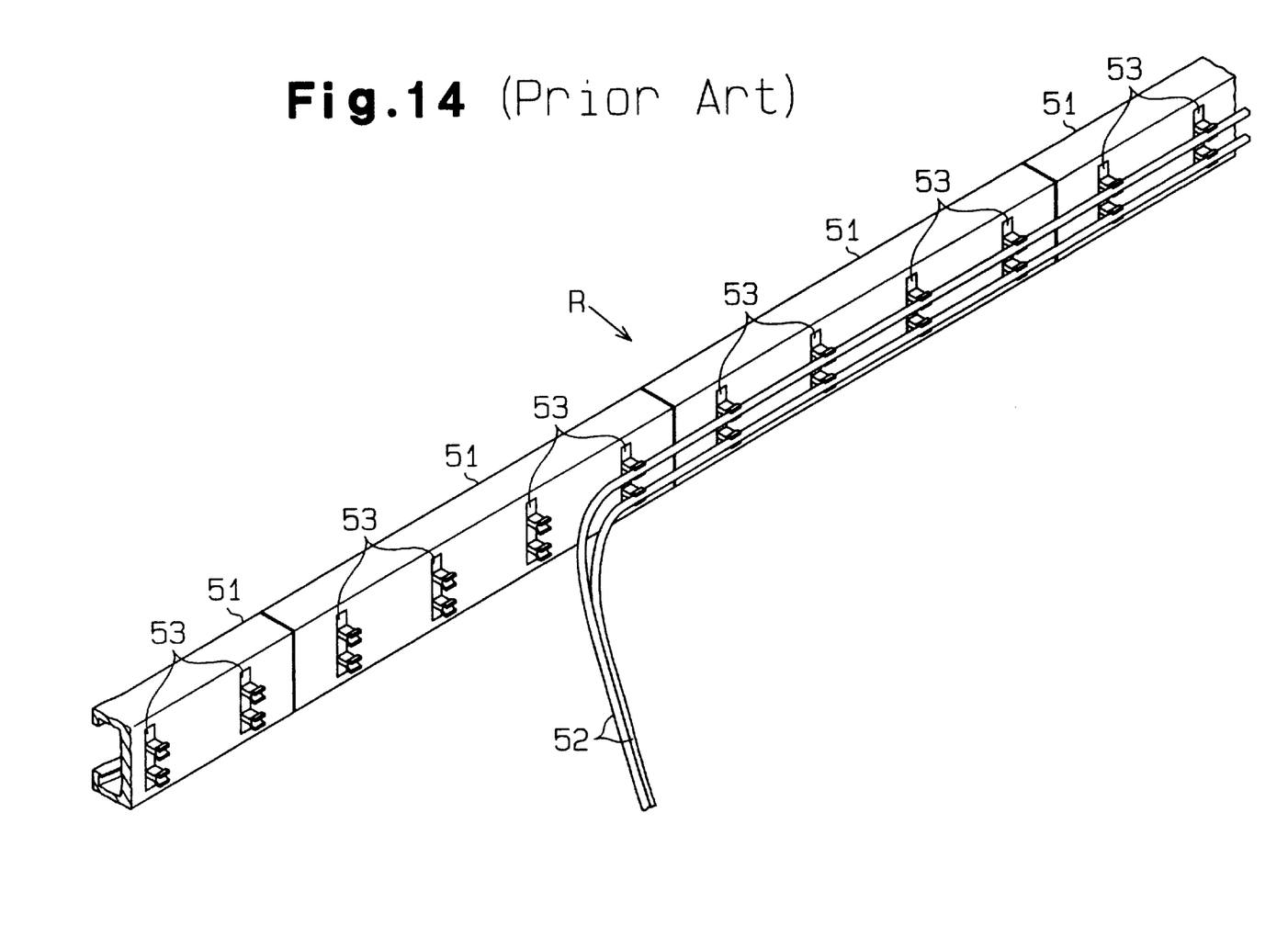
FIG. 14 is a partial perspective view showing a prior art procedure for wiring the rail.

To suspend the rail R, as shown in FIG. 14, rail members 51, which have a length of several meters, are connected to one another along the route of the carriage 1 before suspension. A high lift work vehicle is used to install the rail R. The rail members 51 are supported by support members that are attached to the ceiling or support posts that are erected on the ground. The feeder cable 4 is wired to the rail R after installation.

When wiring the rail R, a wound electric cable 52 is straightened on the ground in correspondence with the rail. An end of the electric cable 52 is then lifted to wire the rail R from its end. The electric cable 52 is fitted to support members 53 that are attached beside the rail members 51 with a predetermined interval between one another.

However, the electric cable 52, which feeds electric power to the carriage 1, is of a standard for high frequency current and has a relatively large diameter (for example, a diameter ranging from 2 to 3 cm). Thus, the electric cable 52 weighs as much as 1 kg or more per meter. Furthermore, the rail R is normally suspended at a position that is three to four meters or more above ground. It is thus necessary to lift the electric cable 52 having a length of several tens of meters, three to four meters or more high continuously from the end of the electric cable 52. The heavy electric cable 52 cannot be lifted and wired using only manual labor in the same manner as normal wiring. Therefore, it is necessary to use large scale equipment (a high lift work vehicle used at electric construction sites) in such constructions. This requires enormous work and a great deal of time.

SUMMARY OF THE INVENTION

Accordingly, it is a main objective of the present invention to improve the efficiency of wiring an electric cable to an elevated rail.

To achieve the above objective, the present invention provides a plurality of rail segments that constitute a rail. The rail is suspended along a predetermined route of a carriage. An electric cable is wired to the rail to feed electric power to the carriage and move the carriage. Each segment includes a body, which has a predetermined length and an electric cable segment supported by the body extending in the longitudinal direction of the body. The electric cable segment is one of a plurality of segments obtained by cutting the electric cable.

In another aspect of the present invention, the present invention provides a method for assembling a wired rail. The method includes the steps of securing a plurality of electric cable segments, which are obtained by cutting the electric cable, to the rail segments, suspending the plurality of rail segments at predetermined positions, and connecting opposed ends of the electric cable segments of adjacent rail segments electrically.

Other embodiments and advantages according to the present invention may be understood by reference to the following description together with the attached drawings.

DETAILED DESCRIPTION OF THE PREFERRED EMBODIMENTS

Figure 1:
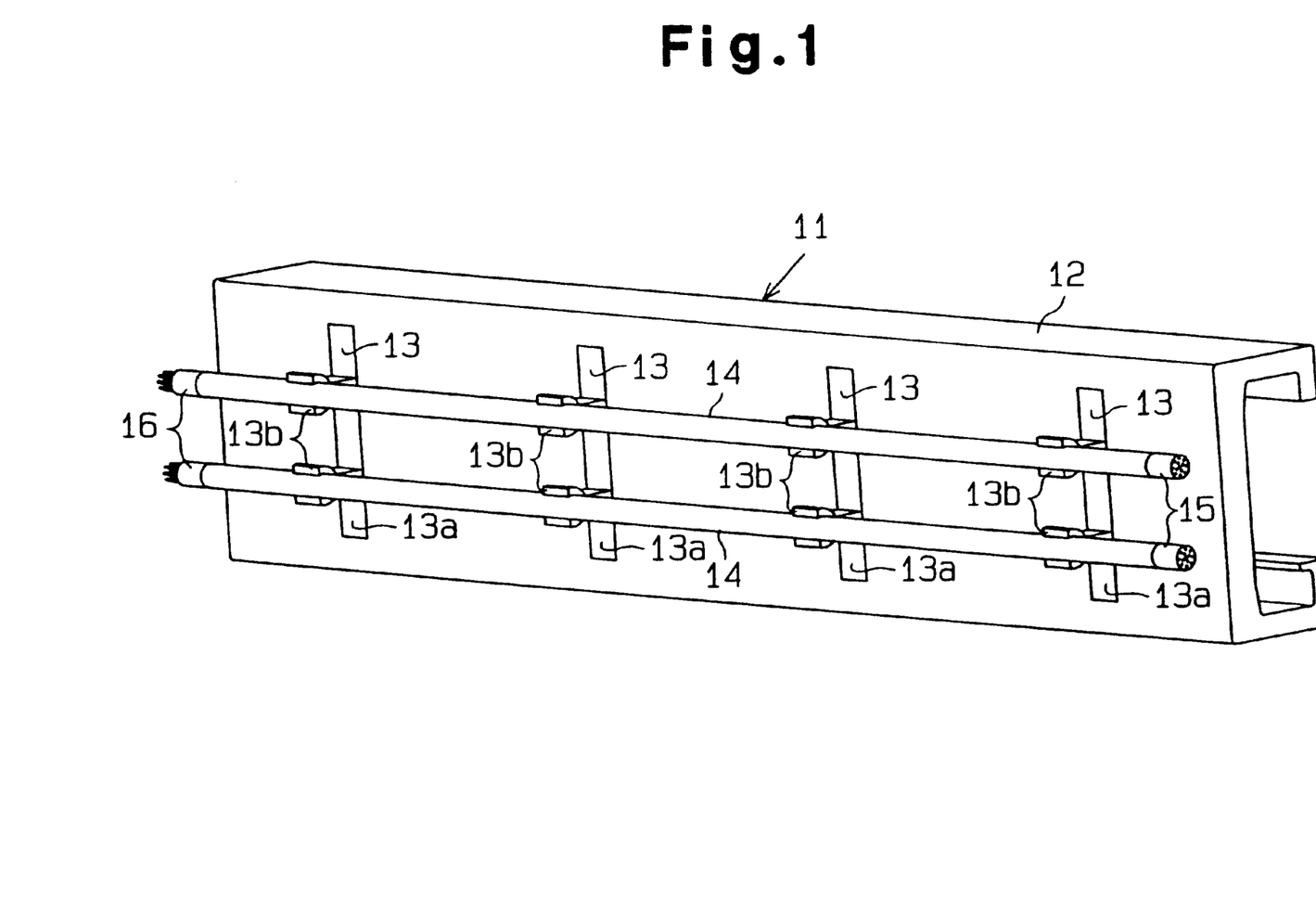
FIG. 1 is a perspective view showing a rail segment of a first embodiment according to the present invention.

A first embodiment according to the present invention will now be described with reference to FIGS. 1 to 3. As shown in FIG. 13, a carriage 1 is suspended from and moves along the rail R.

Figure 2:
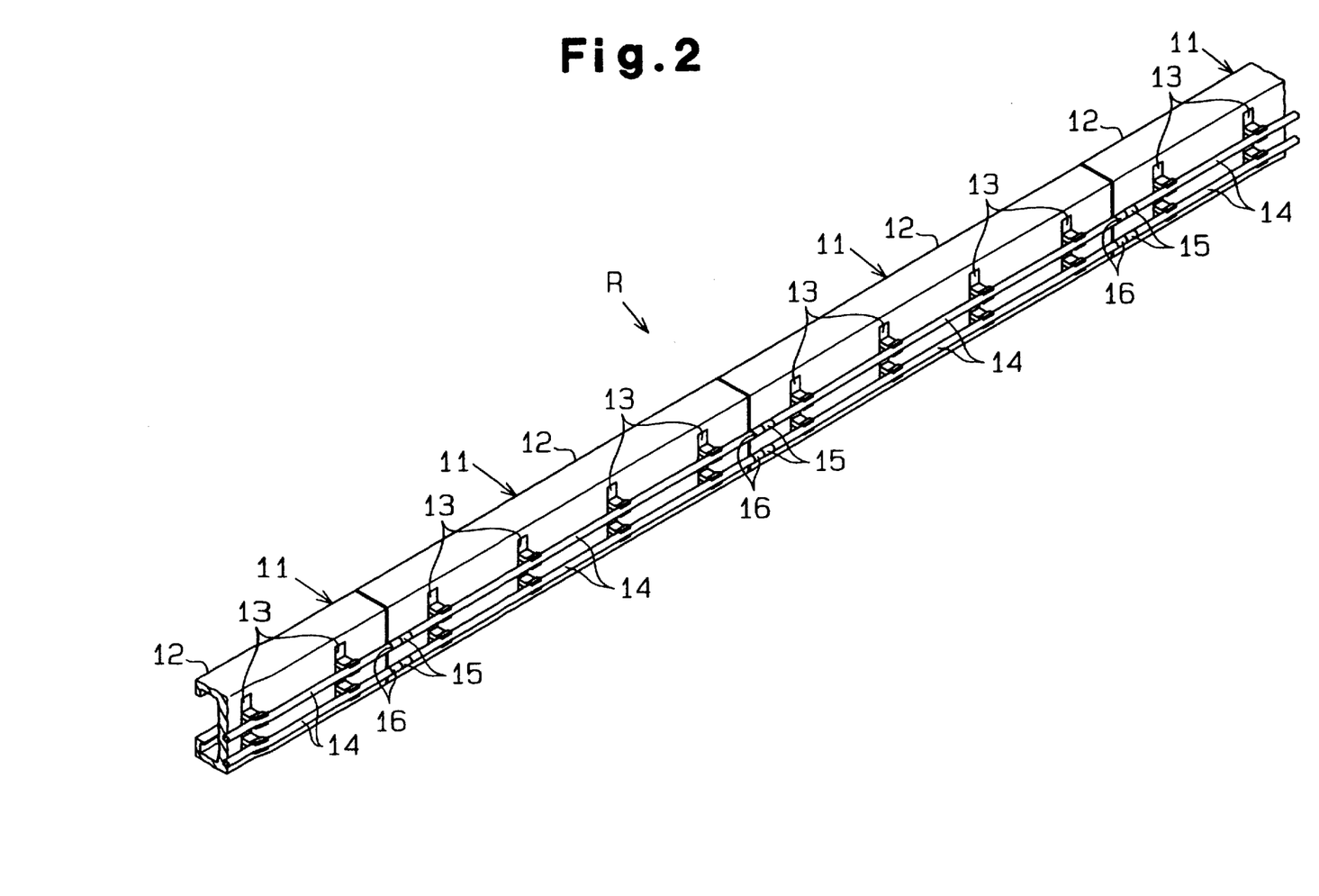
FIG. 2 is a partial perspective view showing a wired rail.
Figure 3A:
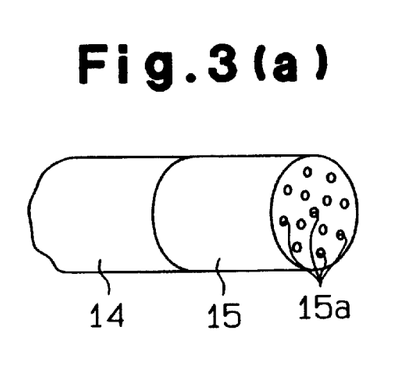
FIG. 3(a) is a partial perspective view showing a female connector.
Figure 3B:
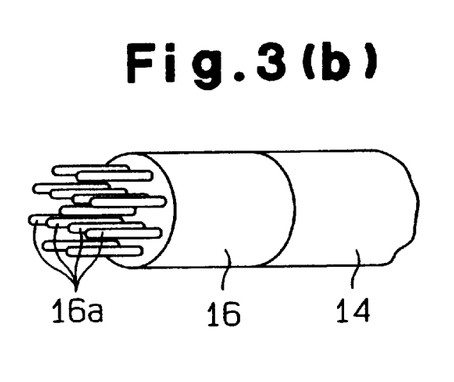
FIG. 3(b) is a partial perspective view showing a male connector that is to be connected to the connector of FIG. 3(a)

As shown in FIG. 2, the rail R is constituted by a plurality of rail segments 11, which are connected to each other. As shown in FIG. 1, each rail segment 11 includes an elongated metal channel bar 12 (the length of which is, for example, approximately three meters). A plurality of resin brackets 13 are attached to one side of each channel bar 12 with a predetermined interval between one another. Although four brackets are used in the embodiment illustrated in FIG. 1, about ten brackets are appropriate for a channel bar having a length of three meters.

Each bracket 13 includes an elongated plate-like seat 13a. Each seat 13a is fitted in a slot (not shown) defined in the side of the channel bar 12 and secured to the channel bar 12 by bolts or the like. This structure enables the brackets 13 to be supported by the channel bar 12 with strength that sufficiently tolerates the weight of a feeder cable 14. A pair of grippers 13b projects from the seat 13a.

Upper and lower feeder cables 14, are supported by the two grippers 13b and extend longitudinally along the channel bar 12. The length of each feeder cable 14 is substantially equal to that of the channel bar 12. In other words, each segment 11, which includes the channel bar 12 and the two feeder cables 14, is one of the units that define the rail R.

A first connector 15 and a second connector 16, which are substantially cylindrical and have diameters equal to the diameter of the feeder cables 14, are attached to the ends of each feeder cable 14 respectively. As shown in FIG. 3(b), the second connector 16 includes a plurality of pins 16a. As shown in FIG. 3(a), the first connector 15 includes the same number of pin bores 15a that receive the pins 16a.

A procedure for wiring the rail R with the segments 11, which are constructed as described above, will hereafter be described.

The rail R is first suspended. As shown in FIG. 1, the two feeder cables 14 are integrally attached to each channel bar 12. The segments 11 are lifted to the height of the route of the carriage 1 (normally three to four meters) by a high lift work vehicle. The segments 11 are then supported by support members provided on the ceiling, or support posts (neither one shown). Subsequently, the channel bars 12 are coupled to one another along the route of the carriage 1.

The feeder cables 14 constitute a part of each unitary segment 11, and are arranged on the associated channel bar 12 at predetermined positions. Thus, after installation of the segments 11, the first and the second connectors 15, 16, which face each other between the feeder cables 14, are connected to one another to complete the wiring of the rail R, as shown in FIG. 2. Accordingly, the feeder cables 14 are easily connected to one another by connecting the first and the second connectors 15, 16, which have been attached to each feeder cable 14 beforehand.

Therefore, the rail R is wired merely by connecting the connectors 15, 16. This eliminates the need for large-scale equipment (for example, high lift work vehicles used for electric construction sites) employed to lift the heavy feeder cables 14 and allows the wiring to be carried out using only manual labor. This reduces the cost and the time required for installation.

The length of each feeder cable 14 is set substantially equal to that of the channel 12. This prevents end portions of the feeder cables 14 from projecting from the ends of the channel bar 12. Thus, the rail R may be installed without being hindered by the feeder cables 14. This improves the efficiency of installation.

If the length of each feeder cable 14 does not correspond to that of each channel bar 12, the length of each feeder cable 14 must be taken into consideration when aligning the segments to arrange the feeder cables 14 along the rail R. However, the segments 11 are compatible if the channel bars 12 have identical lengths and shapes. Thus, only the standard of the channel bars 12 must be taken into consideration when installing the rail R. This simplifies installation of the rail R and improves the work efficiency.

The connectors 15, 16 are compact and have diameters that are substantially equal to that of the feeder cables 14. This positively prevents the coil 6 of the carriage 1, which moves along the rail R, from contacting the connectors 15, 16. Thus, it is not necessary to enlarge the receiving core 5.

A second embodiment according to the present invention will now be described with reference to FIGS. 4 to 7.

Figure 4:
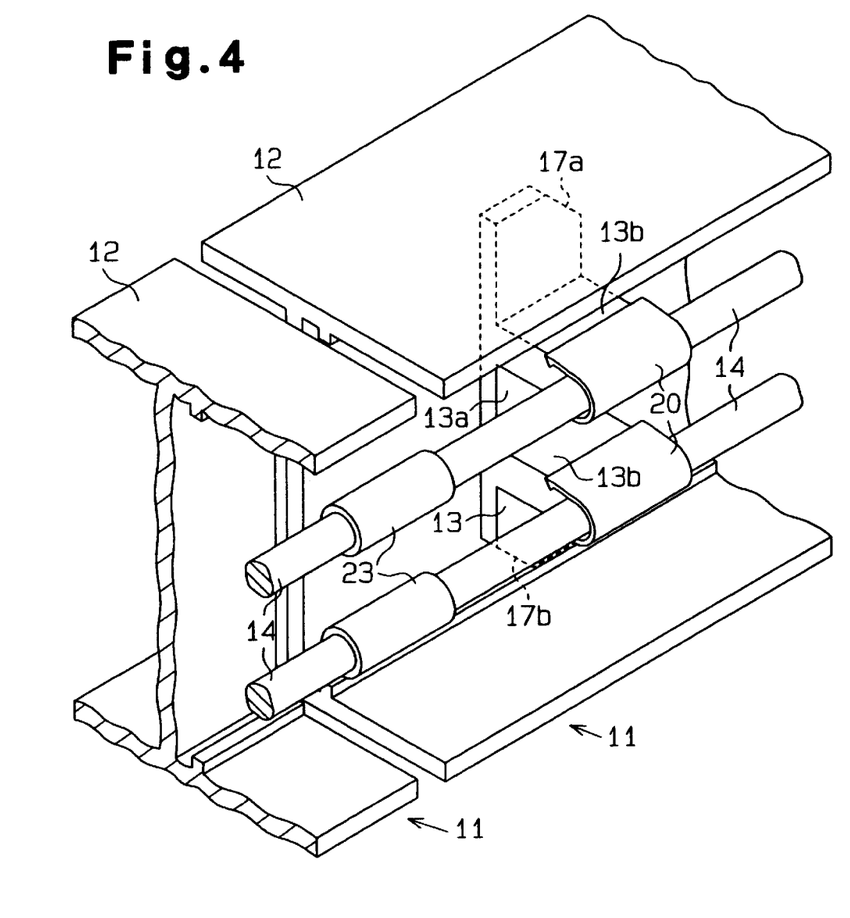
FIG. 4 is a partial perspective view showing rail segments of a second embodiment according to the present invention.
Figure 6:
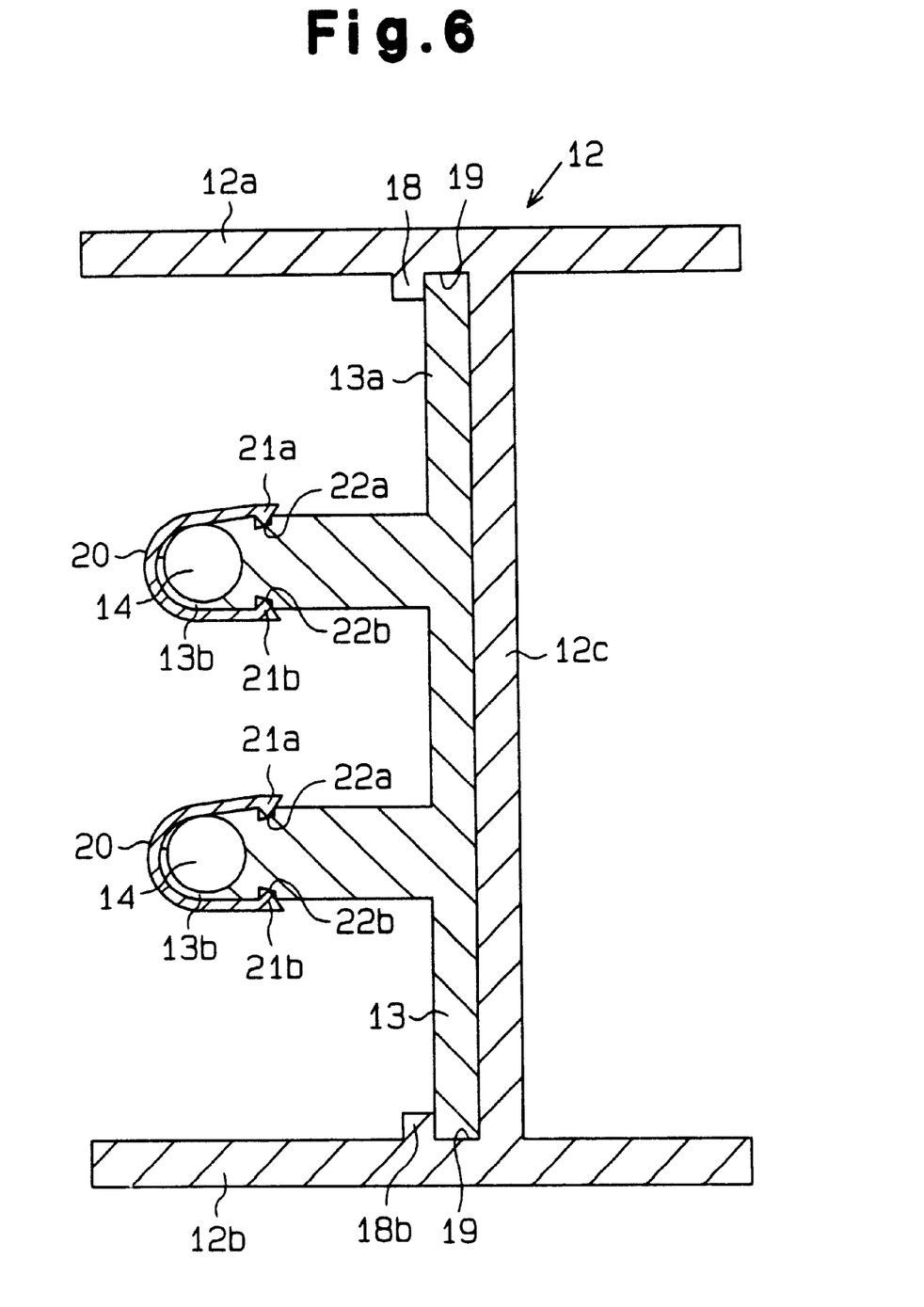
FIG. 6 is a cross-sectional view showing the rail segment of FIG. 4.

As shown in FIGS. 4 and 6, the brackets 13 employed in this embodiment are attached to the inner side of each channel bar 12. As shown in FIG. 6, each channel bar 12 includes an upper horizontal wall 12a, a lower horizontal wall 12b, and a vertical wall 12c that connects the horizontal walls 12a, 12b.

Figure 7:
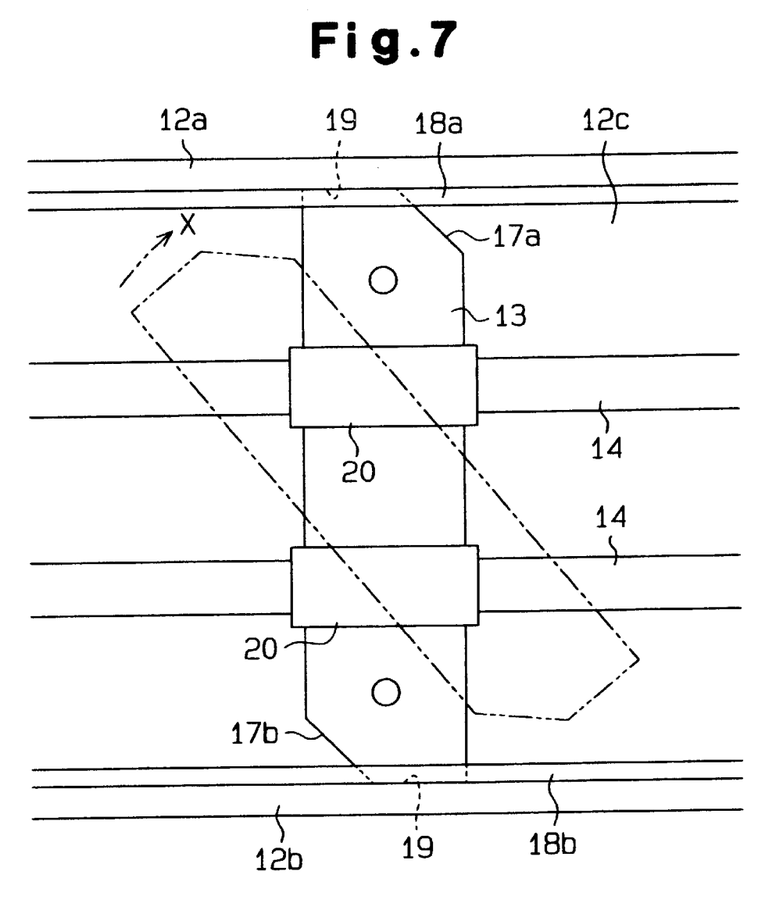
FIG. 7 is an enlarged partial side view showing a main portion of FIG. 4.

As shown in FIGS. 4 and 7, chamfered corners 17a, 17b are defined at the upper and lower portions of each bracket 13. As shown by the two-dotted broken lines, the bracket 13 is pressed against the vertical wall 12c in an inclined manner and then rotated in a direction indicated by the arrow X. The upper and lower portions of each bracket 13 are then fitted in retaining grooves 19 that are defined between ribs 18a, 18b, which are respectively formed in the inner surfaces of the horizontal walls 12a, 12b, and the vertical wall 12c. This enables the bracket 13 to be securely held in the channel bar 12.

As shown in FIG. 6, each bracket 13 is provided with grippers 13b having distal ends to which a cover 20 is attached. Each cover 20 is U-shaped and includes opposing lips 21a, 21b, which project from each end of the cover 20. The lips 21a, 21b are engaged with grooves 22a, 22b, which are defined in the upper and lower surfaces of the gripper 13b. In this manner, the covers 20 securely hold the feeder cables 14 on the grippers 13b.

After attaching the feeder cables 14 to the channel bars 12, the segments 11 are elevated to a predetermined position and supported by the support members or the support posts. Subsequently, the channel bars 12 are connected to one another along the route of the carriage 1.

Figure 5:
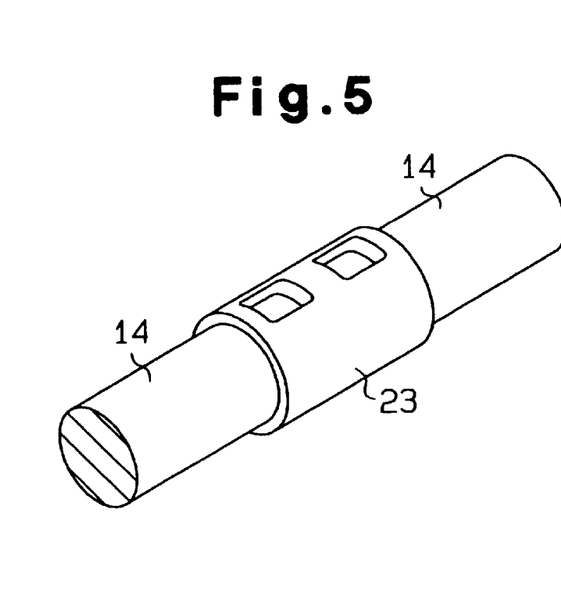
FIG. 5 is a partial perspective view showing a sleeve that connects electric wire segments.

The ends of the feeder cables 14 of adjacent segments 11 are inserted in a hollow cylindrical sleeve 23, after removing the covering at the ends. Subsequently, the ends of each sleeve 23 are crimped to the ends of the feeder cables 14 to connect the adjacent feeder cables 14. An insulating cap made of rubber or ceramic is then fixed to each connected portion.

In this embodiment, the wiring is carried out merely by crimping the sleeves 23 to the feeder cables 14. This facilitates assembly and installation of the heavy electric wires 14 and reduces the required cost and time.

Furthermore, the horizontal walls 12a, 12b of the channel bars 12 hinder the approach of objects that interfere with the rail segments 11 in the factory. The objects are thus prevented from contacting or colliding against the feeder cables 14, which are arranged on the inner surfaces of the channel bars 12. This decreases damage to the feeder cables 14.

In addition, machining is not required to attach the brackets 13 to the channel bars 12. This further decreases installation cost.

Figure 8:
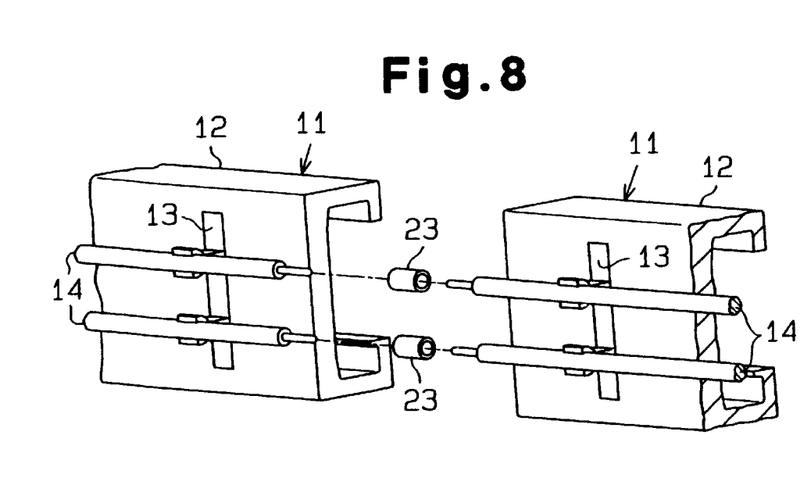
FIG. 8 is a partial perspective view showing a further embodiment.

FIG. 8 shows a further embodiment. In this variation, the brackets 13 are embedded in the outer walls of the channel bars 12. The sleeves 23 are crimped to the feeder cables 14 that are supported by the grippers 13b. This connects the feeder cables 14 to one another.

Figure 9:
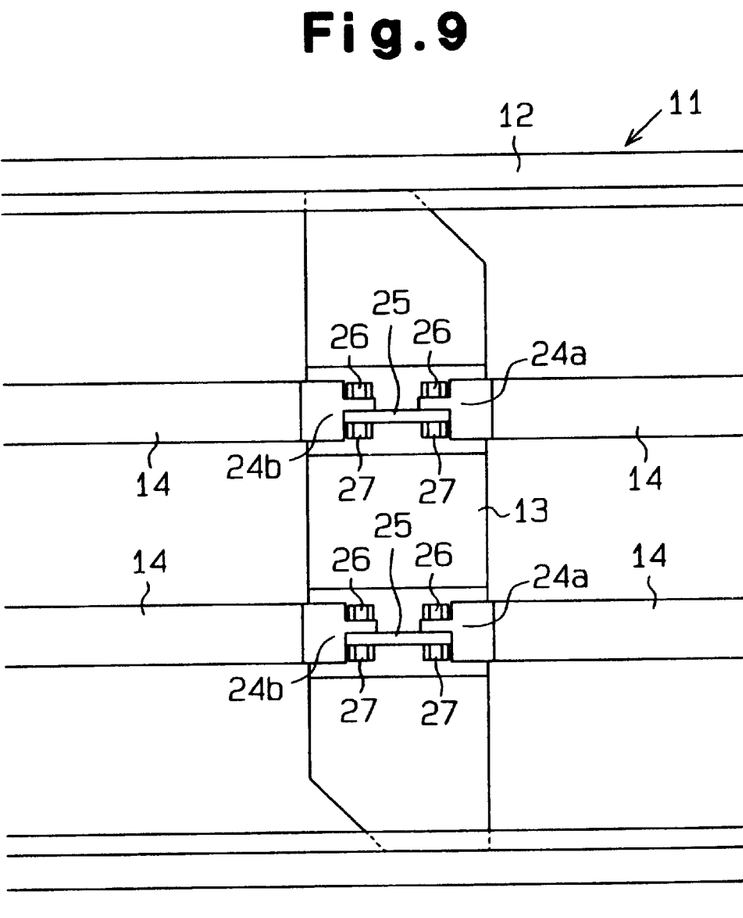
FIG. 9 is a partial side view showing a rail segment of a further embodiment according to the present invention.

A further embodiment according to the present invention will now be described with reference to FIGS. 9 and 10.

Figure 10:
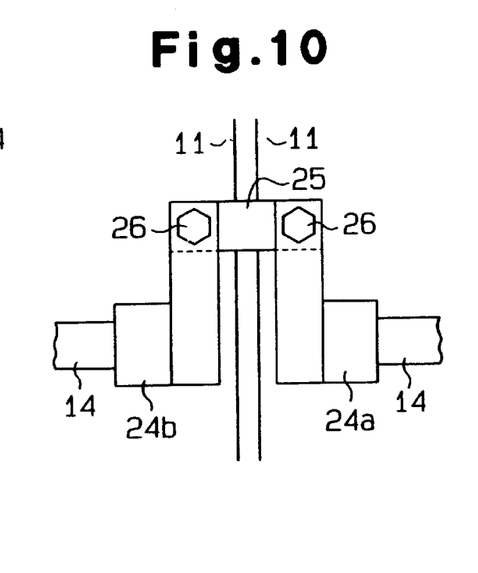
FIG. 10 is an enlarged partial plan view showing electric wire segments connected to each other.

In this embodiment, as shown in FIG. 10, the opposing ends of the feeder cables 14 are held in a pair of L-shaped holding members 24a, 24b, which are made from a conductive material. The two holding members 24a, 24b are connected to each other by a connecting plate 25. Each connecting plate 25 includes layers of copper foil and is detachably connected to the holding members 24a, 24b by bolts 26 and nuts 27, as shown in FIG. 9.

In this embodiment, after lifting the segments 11 to the height of the route of the transporting device 1, the wiring is completed merely by connecting the holding members 24a, 24b with the connecting plates 25. This reduces the cost and the time required for installation.

Furthermore, the connecting plates 25 are detachable from the holding members 24a, 24b. This enables layout changes of the rail R to be easily handled when the route of the transporting device 1 is altered.

Figure 11:
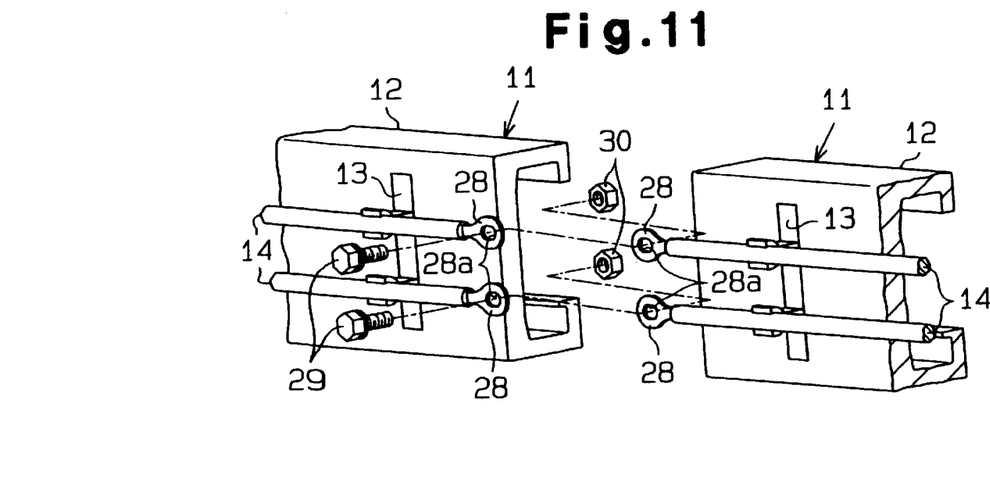
FIG. 11 is a partial side view showing a further embodiment according to the present invention.

A further embodiment according to the present invention will now be described with reference to FIG. 11.

Figure 12:
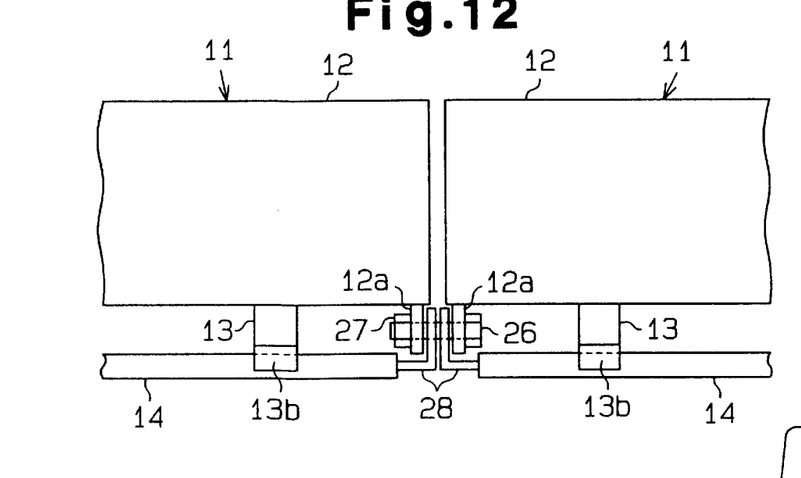
FIG. 12 is a partial side view showing a further embodiment.

In this embodiment, crimp terminals 28 are fixed to the ends of the feeder cables 14. After installation of the segments 11, the opposing crimp terminals 28 are connected to one another by bolts 29 and nuts 30. This connects the feeder cables 14 to each other. Each crimp terminal 28 includes an elongated hole 28a. The position of each bolt 29 is adjusted within the hole 28a. This absorbs dimensional margins that result from differences in the intervals between connected channel bars 12, which are to be connected. This prevents bending of the feeder cables 14 and enables the feeder cables 14 to be maintained substantially straight (parallel) with respect to the rail FIG. 12 shows an further embodiment. In this variation, the crimp terminals 28 are bent in a L-shaped manner. Furthermore, each crimp terminal 28 is secured to a support portion 12a, which extends from each end of the channel bars 12, by a bolt 26 and a nut 27. In this manner, the feeder cables 14 are supported by the support portion 12a. This reinforces the connection between each feeder cable 14.

Furthermore, the crimp terminals 28 are located on the opposite side of the receiving core 5 with respect to the feeder cables 14. Thus, it is not necessary to enlarge the receiving core 5 to avoid interference with the crimp terminals 28.

In addition, the present invention is not restricted to the above description and may be modified as follows.

(a) The feeder cables 14 may be secured to the channel bars 12 after attaching the segments 11 to the ceiling. Subsequently, the feeder cables 14 may be connected to one another by the connectors 15, 16. This wiring procedure also enables the wiring to be completed using only manual labor without large-scale equipment.

(b) It is not necessary to restrict the feeder cables 14 to a length substantially equal to that of the channel bars 12. For example, some segments may be constituted by units including feeder cables that are 1.5 times longer than the length of the channel bars 12. Such segments may be arranged alternately with other segments that do not have feeder cables and assembled to the rail as shown in FIG. 9. This reduces the number of locations where the feeder cables are connected. Thus, the connecting procedure is further simplified.

What is claimed is:

1. A rail segment for forming a rail made up of a plurality of said rail segments, wherein the rail defines a path along which a conveyor carriage travels, the rail segment comprising:

a channel bar having a predetermined length;

a cable segment extending along the length of the channel bar for providing power to the conveyor carriage;

a bracket attached to the channel bar at a location along the length of the channel bar and supporting the cable segment in uniformly spaced relation from said channel bar along the length of the cable segment; and said channel bar having at least one support portion attached to said channel bar adjacent to an end of the channel bar and extending substantially perpendicular to the channel bar for additionally supporting said cable segment.

2. The rail segment of claim 1, wherein said channel bar has an opposite end, and two of said support portions are attached respectively at each of said end and said opposite end of the channel bar.

3. The rail segment of claim 1, wherein said cable segment has opposite ends, each end having a terminal thereon which is connectable by a fastener to another corresponding cable segment end terminal.

4. The rail segment of claim 3, wherein each said end terminal is bent in a direction perpendicularly from said cable segment substantially to the channel bar, said bent terminal being secured to one of said support portions.

5. The rail segment of claim 4, wherein the fastener includes a bolt and a nut.

6. A rail segment for forming a rail made up of a plurality of said rail segments, the rail having a path for a conveyor carriage, and a pair of cables mounted on said rail for supplying power to the conveyor carriage, wherein the carriage has a pickup unit disposed between said pair of cables for picking up power from the cable as the conveyor carriage travels along the rail, the rail segment comprising:

a channel bar having a predetermined length;

a pair of cable segments mounted on the channel bar, each of the cable segments extending in parallel spaced relation to each other along the length of the channel bar, each said cable segment having opposite connecting ends;

a gripper provided for each of said cable segments, the gripper being connected to and protruding from the channel bar, each gripper gripping one of said cable segments and spacing the cable segment away from the channel bar thereby providing a common spacing distance between each of said cable segments and said channel bar; and a cover for each said gripper for attachment to the gripper to secure the cable segment to the gripper;

wherein each said connecting end of each cable segment is electrically connectable to a corresponding cable segment which is mounted on an adjacent corresponding channel bar when the rail is made up.

7. The rail segment according to claim 6, wherein said gripper has a groove, and said cover has a lip to be engaged with said groove thereby securing said cable segment therebetween.

8. A rail segment for forming a rail made up of a plurality of said rail segments, the rail having a path for a conveyor carriage, and a pair of cables mounted on said rail for supplying power to the conveyor carriage, wherein the carriage has a pickup unit disposed between said pair of cables for picking up power from the cable as the conveyor carriage travels along the rail, the rail segment comprising:

a channel bar having a predetermined length;

a pair of cable segments mounted on the channel bar, each of the cable segments extending in parallel spaced relation to each other along the length of the channel bar, each said cable segment having opposite connecting ends; and a gripper provided for each of said cable segments, the gripper being connected to and protruding from the channel bar, each gripper gripping one of said cable segments and spacing the cable segment away from the channel bar thereby providing a common spacing distance between each of said cable segments and said channel bar;

wherein each said gripper comprises a bracket connected to the channel bar, said protruding gripper being mounted on said bracket, wherein said channel bar has a channel cross section comprising a first wall as a base, a second wall as a first leg, and a third wall as a second leg, all extending along the length of the channel bar, each of said first and second legs having a rib which extends in the longitudinal direction of each of said first and second legs and is spaced away from the base to define a groove between the rib and the base, the groove having a width which is substantially the same as a thickness of said bracket, said bracket having length substantially equal to the width of said base and being connected to the channel bar by engagement with the groove, and wherein each said connecting end of each cable segment is electrically connectable to a corresponding cable segment which is mounted on an adjacent corresponding channel bar when the rail is made up.

* * * * *

UNITED STATES PATENT AND TRADEMARK OFFICE
CERTIFICATE OF CORRECTION

PATENT NO. : 6,073,739
DATED : June 13, 2000
INVENTOR(S) : Masaki TAKASAN et al.

It is certified that error appears in the above-indentified patent and that said Letters Patent is hereby corrected as shown below:

Title page, first column, at {54} change the title to --IMPROVED RAIL SEGMENTS--;

Title page, second column, under "FOREIGN PATENT DOCUMENTS" add:
    --7169198    12/96    Japan--

Column 1, line 1, change title "RAIL SEGMENTS" to --IMPROVED RAIL SEGMENTS--;

Column 2, line 46, after "partial" insert --perspective--;

Column 5, line 29, after "rail" insert --R--; line 57, after "rail" insert --R--.

Signed and Sealed this

Seventeenth Day of April, 2001

*Attest:*

NICHOLAS P. GODICI

*Attesting Officer*   *Acting Director of the United States Patent and Trademark Office*